United States Patent [19]

Ono et al.

[11] Patent Number: 5,489,328

[45] Date of Patent: Feb. 6, 1996

[54] WATER REPELLENT AGENT

[75] Inventors: Ichiro Ono; Hitoshi Uehara; Shoji Ichinohe, all of Usui, Japan

[73] Assignee: Shin-Etsu Chemical Co., Ltd., Tokyo, Japan

[21] Appl. No.: 380,693

[22] Filed: Jan. 30, 1995

[30] Foreign Application Priority Data

Jan. 31, 1994 [JP] Japan ..................... 6-027341

[51] Int. Cl.⁶ .................. C08G 77/24; C09D 183/08; C09K 3/18
[52] U.S. Cl. .................. 106/2; 528/42; 106/287.28; 106/287.15; 106/287.13; 106/287.16
[58] Field of Search ................ 528/42; 106/2, 106/287.28, 287.15, 287.13, 287.16

[56] References Cited

U.S. PATENT DOCUMENTS 5,442,011  8/1995  Halling ........................ 528/42

*Primary Examiner*—C. Melissa Bonner
*Attorney, Agent, or Firm*—Millen, White, Zelano & Branigan

[57] ABSTRACT

A hydrolyzate resulting from co-hydrolysis of a perfluoroalkyl group-containing organic silicon compound and a hydrolyzable group-containing methylpolysiloxane compound in a hydrophilic solvent and water constitutes a water repellent agent which is effective for imparting water repellency and facilitating falling of water droplets and thus imparting excellent water repellency and stain-proofness to a surface of an article treated therewith.

4 Claims, No Drawings

WATER REPELLENT AGENT

BACKGROUND OF THE INVENTION

1. Field of the Invention

This invention relates to a water repellent agent for use in treating inorganic materials such as glass, ceramics and metals for imparting water repellency and stain-proofness to their surface. More particularly it relates to a water repellent agent for treating inorganic materials such that the inorganic material surface may be self-cleaning with rain water.

2. Prior Art

Various research endeavors have been made for enhancing the performance and expanding the applicable range of inorganic materials such as glass, ceramics and metals by treating the inorganic materials at their surface with various surface treating agents for improving surface properties. One typical technique is to treat an inherently hydrophilic surface with a silicone composition for modifying the surface to be water repellent.

Japanese Patent Application Kokai (JP-A) Nos. 147484/1983, 221470/1985 (or U.S. Pat. No. 4,678,688) and 96935/1992 disclose that polysiloxane and polysilazanes having a perfluoroalkyl group excel in water repellency. These water repellent agents are excellent in water repellency, but less effective in allowing water droplets to fall down. When they are applied to glazing in houses and buildings as stain-proof treating agents, water droplets tend to stay on the glazing surface as dots instead of falling down. Then the glazing is undesirably stained because dust, debris and oil in the atmosphere can adhere to such water droplets.

Also fluorinated silazane compounds are disclosed in JP-A 290437/1991. Although these compounds eliminate the above-mentioned drawback, they are substantially insoluble in conventional organic solvents. They are soluble only in Freons currently under federal restriction such as 1,1,3-trichlorotrifluoro-ethane and expensive fluorinated hydrocarbons. This limits the application range.

SUMMARY OF THE INVENTION

Therefore, an object of the present invention is to provide a water repellent agent which is soluble in organic solvents and effective for treating inorganic materials to render their surface water repellent and to allow water droplets on their surface to fall down, thereby imparting water repellency and stain-proofness to their surface.

According to the present invention, there is provided a water repellent agent comprising a hydrolyzate resulting from co-hydrolysis of a perfluoroalkyl group-containing organic silicon compound and a hydrolyzable group-containing methylpolysiloxane compound in a hydrophilic solvent and water. The perfluoroalkyl group-containing organic silicon compound has the following general formula (I):

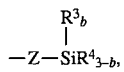

$$C_pF_{2p+1}QSiR^2_{3-a} \quad (I)$$

wherein $R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12. The hydrolyzable group-containing methylpolysiloxane compound has the following general formula (II):

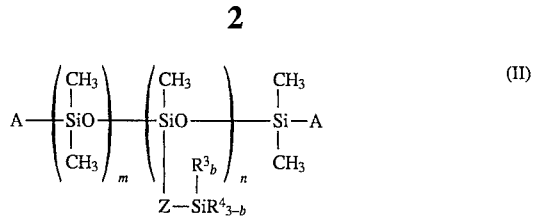

wherein $R^3$ is a monovalent hydrocarbon group having 1 to 4 carbon atoms, $R^4$ is an alkoxy or acyloxy group having 1 to 4 carbon atoms, A is a methyl group or a group represented by

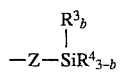

$$-Z-SiR^4_{3-b},$$

Z is an oxygen atom or a divalent hydrocarbon group having 2 to 10 carbon atoms, letter b is equal to 0, 1 or 2, m is an integer of 3 to 100, n is an integer of 0 to 50, and $5 \leq m+n \leq 100$. At least one of the terminal A groups is a group represented by $$-Z-SiR^4_{3-b}$$

when n=0.

More particularly, the perfluoroalkyl group-containing organic silicon compound of formula (I) is effective in imparting water repellency and the hydrolyzable group-containing methylpolysiloxane compound of formula (II) is effective for allowing water droplets to flow down. Since a hydrolyzate resulting from co-hydrolysis of these compounds has a silanol group fully reactive with an inorganic surface, it can impart water repellency and stain-proofness to an inorganic surface treated therewith. In addition, the hydrolyzate is soluble in hydrophilic solvents and thus applicable to a wide variety of materials without the aid of special fluorinated solvents. The hydrolyzate is thus effective as a water repellent agent.

DETAILED DESCRIPTION OF THE INVENTION

A first source material for use in preparing the water repellent agent of the invention is a perfluoroalkyl group-containing organic silicon compound of the general formula (I).

$$C_pF_{2p+1}QSiR^2_{3-a} \quad (I)$$

In formula (I), $R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12.

Typically, $R^1$ is selected from methyl, ethyl, n-propyl, isopropyl, n-butyl, isobutyl and s-butyl groups, for example. $R^2$ is selected from methoxy, ethoxy, n-propoxy, isopropoxy, isopropenoxy, n-butoxy, and acetoxy groups, for example. Q is a divalent organic group having 2 to 10 carbon atoms of connecting a perfluoro alkyl group to the silicon atom, which is exemplified by a divalnet hydrocarbon group or a divalent hydrocarbon group containing oxygen atom, nitrogen atom or sulfur atom such as $-CH_2CH_2-$, $-CH_2OCH_2CH_2CH_2-$, $-CONHCH_2CH_2CH_2-$, $-CONHCH_2CH_2NHCH_2CH_2CH_2-$,

$-SO_2NHCH_2CH_2CH_2-$, and

—CH$_2$CH$_2$OCONHCH$_2$CH$_2$CH$_2$—. Letter p represents the number of carbon atoms in the perfluoroalkyl group and ranges from 1 to 12. With p in excess of 12, corresponding hydrolyzates become less soluble in organic solvents.

Below shown are examples of the perfluoroalkyl group-containing organic silicon compound of formula (I). These compounds may be used alone or in admixture of two or more.

CF$_3$CH$_2$CH$_2$Si(OCH$_3$)$_3$,

C$_4$F$_9$CH$_2$CH$_2$Si(OCH$_3$)$_2$, C$_8$F$_{17}$CH$_2$CH$_2$Si(OCH$_3$)$_3$,

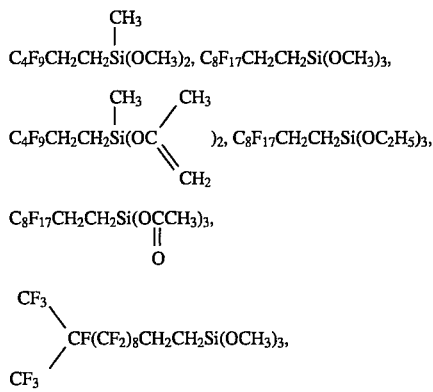

C$_8$F$_{17}$CH$_2$CH$_2$Si(OCCH$_3$)$_3$,
$\parallel$
O

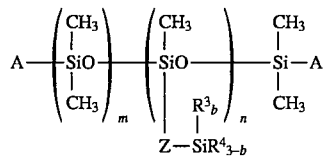

C$_7$F$_{15}$CONHCH$_2$CH$_2$CH$_2$Si(OC$_2$H$_5$)$_3$,
C$_8$F$_{17}$SO$_2$NHCH$_2$CH$_2$CH$_2$Si(OC$_2$H$_5$)$_3$,
C$_8$F$_{17}$CH$_2$CH$_2$OCONHCH$_2$CH$_2$CH$_2$Si(OCH$_3$)$_3$

A second source material for use in preparing the water repellency agent of the invention is a hydrolyzable group-containing methylpolysiloxane compound of the general formula (II).

$$A\left(\begin{array}{c}CH_3\\|\\SiO\\|\\CH_3\end{array}\right)_m\left(\begin{array}{c}CH_3\\|\\SiO\\|\\R^3{}_b\\|\\Z-SiR^4{}_{3-b}\end{array}\right)_n\begin{array}{c}CH_3\\|\\Si-A\\|\\CH_3\end{array} \quad (II)$$

In formula (II), R$^3$ is a monovalent hydrocarbon group having 1 to 4 carbon atoms, R$^4$ is an alkoxy or acyloxy group having 1 to 4 carbon atoms, A is a methyl group or a group represented by

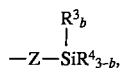

Z is an oxygen atom or a divalent hydrocarbon group having 2 to 10 carbon atoms, letter b is equal to 0, 1 or 2, m is an integer of 3 to 100, n is an integer of 0 to 50, and 5≦m+n≦100. At least one of the terminal A groups is a group represented by

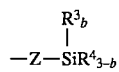

when n=0.

Exemplary groups of R$^3$ are the same as described for R$^1$. Exemplary groups of R$^4$ are the same as described for R$^2$. Exemplary groups of the divalent hydrocarbon group represented by Z are alkylene groups as shown below.

—CH$_2$CH$_2$—, —CH$_2$CH$_2$CH$_2$—,

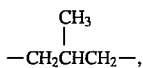

—CH$_2$CH$_2$CH$_2$CH$_2$CH$_2$CH$_2$—,
—CH$_2$CH$_2$CH$_2$CH$_2$CH$_2$CH$_2$CH$_2$CH$_2$CH$_2$CH$_2$—

Letter m is an integer of 3 to 100, n is an integer of 0 to 50, and 5≦m+n≦100. Preferably, 5≦m≦50, 0≦n≦10 and 5≦m+n≦60. If the sum of m and n is less than 5, corresponding hydrolyzates less facilitate dropping of water droplets and are thus less stain-proof. If the sum of m and n exceeds 100, corresponding hydrolyzates become less stable.

Preferably the perfluoroalkyl group-containing organic silicon compound of formula (I) and the hydrolyzable group-containing methylpolysiloxane compound of formula (II) are blended such that the weight ratio of (I)/(II) may range from 10/90 to 90/10, especially from 20/80 to 80/20. Less than 10% by weight of the compound of formula (I) blended would sometimes fail to provide sufficient water repellency whereas more than 90% by weight of the compound of formula (I) blended would somewhat inhibit dropping of water droplets, resulting in less stain-proofness.

A hydrophilic solvent is used in co-hydrolysis of the two compounds mentioned above. It may be selected from conventional solvents in which the compounds of formulae (I) and (II) and water are soluble. Examples of the hydrophilic solvent include alcohols such as methanol, ethanol, isopropanol, and n-propanol; cellosolves such as methyl cellosolve, ethyl cellosolve, butyl cellosolve, and cellosolve acetate; ketones such as acetone and methyl ethyl ketone; and ethers such as dioxane and tetrahydrofuran. The hydrophilic solvent may be used in any desired amount, preferably in such amounts that the concentration of the compounds of formulae (I) and (II) combined may range from about 1 to 30% by weight, more preferably about 3 to 15% by weight.

Co-hydrolysis is effected using water. Water is preferably added in such amounts to provide 0.5 equivalents or more, preferably 0.5 to 2 equivalents of water relative to the total of the alkoxy and acyloxy groups available in the compounds of formulae (I) and (II). On this basis, less than 0.5 equivalent of water would result in a lower degree of hydrolysis and hence, lower reactivity with an inorganic surface. More than 2 equivalents of water may be often superfluous.

In the practice of the invention, minor amounts of acid may be added to the hydrolysis system for the purpose of promoting hydrolysis reaction. The acid is preferably added such that the co-hydrolysis system has a pH of less than 7, preferably 5 or less. Exemplary acids are hydrochloric acid, sulfuric acid, nitric acid, acetic acid, methanesulfonic acid, trifluoromethanesulfonic acid, paratoluene-sulfonic acid, trifluoroacetic acid, and phosphoric acid.

Co-hydrolysis is preferably effected at a temperature of about 50° to 100° C. for about 2 to 10 hours though the invention is not limited thereto.

The co-hydrolyzate as produced above may be used as the water repellent agent. If desired, the co-hydrolyzate may be diluted with any of the above-mentioned hydrophilic solvents and organic solvents, for example, aromatic hydrocarbons such as benzene, toluene, and xylene and esters such as ethyl acetate and isobutyl acetate, typically to a concentration of about 0.1 to 5% by weight before use. The water repellent agent is applied to a surface of an article to be treated by conventional methods such as dipping, spraying, brush coating, and spin coating, followed by drying to render the surface durably water repellent and stain-proof.

Drying at room temperature is satisfactory although heating at 40° to 200° C. for 5 to 60 minutes is favorable for durability.

There has been described a water repellent agent in the form of a co-hydrolyzate of a perfluoroalkyl group-containing organic silicon compound and a hydrolyzable group-containing methylpolysiloxane compound. The agent is excellent in imparting water repellency and facilitating the falling of water droplets and thus impart excellent water repellency and stain-proofness to a surface of an article treated therewith. Since the agent is soluble in organic solvents, it can be used in surface treatment of various articles of inorganic materials presenting an inorganic surface. The agent is widely used in surface treatment of glazing in buildings, trains, aircraft and other vehicles, optical parts such as mirrors and glass lenses, various glass articles, porcelain, tiles, and plastic materials having inorganic anti-reflection coatings or silicone hard coatings.

EXAMPLE

Examples of the present invention are given below by way of illustration and not by way of limitation.

Example 1

A 1-liter glass reactor equipped with a thermometer, stirrer, and condenser was charged with 10.0 g of a perfluoroalkyl group-containing organic silicon compound as shown below, 10.0 g of a hydrolyzable group-containing methylpolysiloxane compound as shown below, 480.0 g of isopropanol as a hydrophilic solvent, and 1.94 g of 0.1N aqueous hydrochloric acid. The pH of the co-hydrolysis system was 2.5. Co-hydrolysis reaction was effected at 80° C. for 5 hours, obtaining a water repellent agent in solution form.

Perfluoroalkylated silicon compound:
$C_8F_{17}CH_2CH_2Si(OCH_3)_3$
Methylpolysiloxane compound:

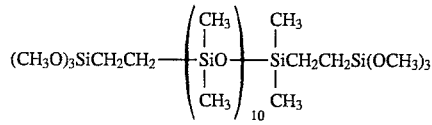

Examples 2–6 & Comparative Examples 1–2

Water repellent agents in solution form were prepared by the same procedure as in Example 1 except that the type and amount of the perfluoroalkyl group-containing organic silicon compound, hydrolyzable group-containing methylpolysiloxane compound, hydrophilic solvent, and water were changed as shown in Table 1.

Comparative Example 3

The same perfluoroalkyl group-containing organic silicon compound, hydrolyzable group-containing methylpolysiloxane compound, isopropanol and 0.1N aqueous hydrochloric acid as in Example 1 were used and blended without effecting co-hydrolysis reaction to obtain a water repellent agent.

The water repellent agent solutions of Examples and Comparative Examples were coated onto glass plates which had been degreased and cleaned with acetone and dried, to form coatings of 4 μm thick, which were heat treated to 100° C. for 10 minutes. The coated surfaces were examined for contact angle with water, water droplet drop angle, stain-proofness by the following tests. The results are shown in Table 1.

Contact angle with water

5 μl of water was placed on a glass plate held horizontally. A contact angle with water was measured by means of a contact angle meter model CA-A (manufactured by Kyowa Kagaku K.K.).

Water droplet drop angle

A glass plate was set horizontally in a static frictional coefficient measuring machine model HEIDON-10 (manufactured by Shinto Kagaku K.K.). After 100 μl of water was placed on the glass plate, the plate was gradually inclined. The angle at which water started flowing down under gravity was measured.

Stain-proofness

A glass plate was set at an angle of 45° in a sunshine weatherometer (manufactured by Suga Shikenki K.K.) and exposed to weathering for 100 hours before the outer appearance was observed.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Perfluoroalkylated silicon compound (g) | | | | | | | | | |
| Compound of formula (1) |  | 20.0 |  |  |  |  |  |  |  |
| Compound of formula (2) |  |  | 10.0 |  |  |  |  |  |  |
| Compound of formula (3) | 10.0 |  |  | 5.0 | 10.0 |  | 20.0 |  | 10.0 |
| Compound of formula (4) |  |  |  |  |  | 5.0 |  |  |  |
| Methylpolysiloxane compound (g) | | | | | | | | | |
| Compound of formula (5) | 10.0 |  |  |  |  | 5.0 |  | 20.0 | 10.0 |
| Compound of formula (6) |  | 5.0 |  |  | 10.0 |  |  |  |  |
| Compound of formula (7) |  |  | 20.0 |  |  |  |  |  |  |
| Compound of formula (8) |  |  |  | 45.0 |  |  |  |  |  |
| Water (g) | | | | | | | | | |
| Pure water |  | 5.07 |  |  |  | 0.93 |  |  |  |
| 0.1 N HCl water | 1.94 |  | 1.72 | 4.70 |  |  | 1.90 | 1.97 | 1.94 |
| 0.1 N H$_2$SO$_4$ water |  |  |  |  | 1.17 |  |  |  |  |
| Hydrophilic solvent (g) | | | | | | | | | |

TABLE 1-continued

|  | Example | | | | | | Comparative Example | | |
|---|---|---|---|---|---|---|---|---|---|
|  | 1 | 2 | 3 | 4 | 5 | 6 | 1 | 2 | 3 |
| Isopropanol | 480.0 | 100.0 | 300.0 | 450.0 | 480.0 | 160.0 | 380.0 | 380.0 | 480.0 |
| Methyl ethyl ketone |  |  | 300.0 |  |  | 160.0 |  |  |  |
| Co - hydrolysis conditions (°C./hour) | 80/5 | 80/10 | 80/5 | 80/5 | 80/2 | 80/10 | 80.5 | 80/5 | — |
| Diluent (g) |  |  |  |  |  |  |  |  |  |
| Ethyl acetate |  | 350.0 |  | 450 |  |  |  |  |  |
| Isopropanol |  | 350.0 |  |  |  |  |  |  |  |
| Properties |  |  |  |  |  |  |  |  |  |
| Contact angle with water (deg.) | 110 | 101 | 104 | 108 | 112 | 108 | 110 | 88 | 86 |
| Water droplet drop angle (deg.) | 18 | 16 | 20 | 20 | 16 | 22 | 35 | 16 | 20 |
| Stain - proofness | good looking | good looking | good looking | good looking | good looking | good looking | bio-slime deposit | bio-slime deposit | bio-slime deposit |

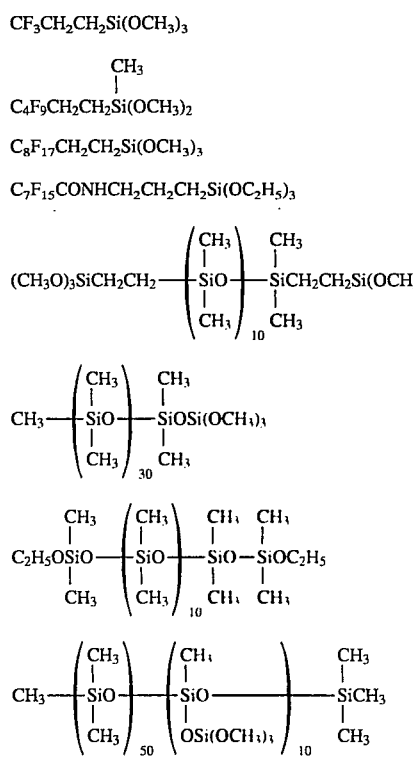

$$CF_3CH_2CH_2Si(OCH_3)_3 \quad (1)$$

$$C_4F_9CH_2CH_2\underset{\underset{CH_3}{|}}{Si}(OCH_3)_2 \quad (2)$$

$$C_8F_{17}CH_2CH_2Si(OCH_3)_3 \quad (3)$$

$$C_7F_{15}CONHCH_2CH_2CH_2Si(OC_2H_5)_3 \quad (4)$$

As is evident from Table 1, the water repellent agents of Examples within the scope of the invention are excellent in imparting water repellency and facilitating falling of water droplets and thus impart excellent water repellency and stain-proofness to a surface of an article treated therewith.

Japanese Patent Application No. 6-27341 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A water repellent agent comprising a hydrolyzate resulting from co-hydrolysis of a perfluoroalkyl group-containing organic silicon compound and a hydrolyzable group-containing methylpolysiloxane compound in a hydrophilic solvent and water, said perfluoroalkyl group-containing organic silicon compound having the following general formula (I):

$$C_pF_{2p+1}Q\underset{\underset{R^1{}_a}{|}}{Si}R^2{}_{3-a} \quad (I)$$

wherein $R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12, and said hydrolyzable group-containing methylpolysiloxane compound having the following general formula (II):

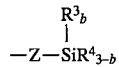

wherein $R^3$ is a monovalent hydrocarbon group having 1 to 4 carbon atoms, $R^4$ is an alkoxy or acyloxy group having 1 to 4 carbon atoms, A is a methyl group or a group represented by $$-Z-SiR^4{}_{3-b},\underset{\underset{R^3{}_b}{|}}{}$$

Z is an oxygen atom or a divalent hydrocarbon group having 2 to 10 carbon atoms, letter b is equal to 0, 1 or 2, m is an integer of 3 to 100, n is an integer of 0 to 50, and $5 \leq m+n \leq 100$, with the proviso that at least one of the terminal A groups is a group represented by $$-Z-SiR^4{}_{3-b}\underset{\underset{R^3{}_b}{|}}{}$$

when n=0.

2. The water repellent agent of claim 1 wherein the perfluoroalkyl group-containing silicon compound of formula (I) and the hydrolyzable group-containing methylpolysiloxane compound of formula (II) are co-hydrolyzed such that the weight ratio of (I)/(II) is range from 10/90 to 90/10.

3. The water repellent agent of claim 1 wherein water is added in such an amount to provide 0.5 to 2 equivalents of water relative to the alkoxy and acyloxy groups available in the compounds of formulae (I) and (II).

4. The water repellent agent of claim 1 wherein acid is added to the hydrophilic solvent.

* * * * *